US010375644B2

(12) United States Patent
Meredith et al.

(10) Patent No.: US 10,375,644 B2
(45) Date of Patent: Aug. 6, 2019

(54) METHOD AND APPARATUS FOR OPTIONALLY RUNNING MOBILE APPLICATIONS LOCALLY OR VIRTUALLY

(71) Applicant: AT&T INTELLECTUAL PROPERTY I, L.P., Atlanta, GA (US)

(72) Inventors: Sheldon Kent Meredith, Roswell, GA (US); Brandon B. Hilliard, Woodstock, GA (US); William Cottrill, Canton, GA (US); Ivan Rasnik, Decatur, GA (US); Radhika Gouni, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 138 days.

(21) Appl. No.: 15/434,723

(22) Filed: Feb. 16, 2017

(65) Prior Publication Data

US 2018/0234922 A1    Aug. 16, 2018

(51) Int. Cl.
*H04W 52/02*    (2009.01)
*H04L 29/08*    (2006.01)
(Continued)

(52) U.S. Cl.
CPC ..... *H04W 52/0261* (2013.01); *H04L 43/0811* (2013.01); *H04L 43/0817* (2013.01); *H04L 43/0847* (2013.01); *H04L 43/0852* (2013.01); *H04L 67/10* (2013.01); *H04W 4/80* (2018.02); *H04W 52/0245* (2013.01);
(Continued)

(58) Field of Classification Search
CPC ....... H04W 4/60; H04W 28/04; H04W 28/18; H04W 4/50; H04L 67/04; H04L 67/06; H04L 67/08; H04L 67/14; H04L 67/142; H04L 67/36; H04L 67/2809; H04M 1/72527; H04N 2005/44556; H04N 21/23614; H04N 21/4104; H04N 21/4126; H04N 21/431
See application file for complete search history.

(56) References Cited

U.S. PATENT DOCUMENTS 8,204,536 B2    6/2012    Franklin et al.
8,934,871 B2    1/2015    Finkelstein et al.
(Continued)

OTHER PUBLICATIONS

Fernando, Niroshinie, "Mobile cloud computing: A survey", Future Generation Computer Systems 29, 2013, 84-106.

*Primary Examiner* — Yemane Mesfin
*Assistant Examiner* — Mon Cheri S Davenport
(74) *Attorney, Agent, or Firm* — Guntin & Gust, PLC; Ralph Trementozzi

(57) ABSTRACT

Aspects of the subject disclosure may include, for example, a system and method, for determining whether to run a local application or a remote application, including retrieving, by a processor of a mobile device, metadata for a remote application that executes on the mobile device, determining power requirements from the metadata for a data connection with a remote server that provides services to support execution of the remote application, calculating if the power requirements for the data connection exceeds a remaining charge of a battery of the mobile device, and executing the remote application responsive to the power requirements for the data connection being less than the remaining charge of the battery. Other embodiments are disclosed.

20 Claims, 7 Drawing Sheets

(51) Int. Cl.
*H04L 12/26* (2006.01)
*H04W 4/80* (2018.01)
*H04W 84/12* (2009.01)

(52) U.S. Cl.
CPC ............ *H04W 84/12* (2013.01); *Y02D 70/00* (2018.01); *Y02D 70/10* (2018.01); *Y02D 70/1224* (2018.01); *Y02D 70/1242* (2018.01); *Y02D 70/1244* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/23* (2018.01)

(56) References Cited

U.S. PATENT DOCUMENTS

| | | |
|---|---|---|
| 9,021,139 B1 | 4/2015 | Pathuri et al. |
| 9,107,146 B2 | 8/2015 | Chow et al. |
| 9,240,977 B2 | 1/2016 | Tumula et al. |
| 9,338,279 B2 | 5/2016 | Kuehne et al. |
| 2005/0215260 A1 | 9/2005 | Ahya et al. |
| 2011/0145920 A1* | 6/2011 | Mahaffey ............ G06F 21/564 726/22 |
| 2014/0071895 A1 | 3/2014 | Bane et al. |
| 2014/0223531 A1 | 8/2014 | Outwater et al. |
| 2015/0120807 A1* | 4/2015 | Bharadwaj ............ H04W 4/60 709/203 |
| 2015/0139074 A1 | 5/2015 | Bane et al. |
| 2015/0342511 A1 | 12/2015 | Goldberg |

\* cited by examiner

300

METHOD AND APPARATUS FOR OPTIONALLY RUNNING MOBILE APPLICATIONS LOCALLY OR VIRTUALLY

FIELD OF THE DISCLOSURE

The subject disclosure relates to mobile computing, and more particularly to a method and apparatus for optionally running mobile applications locally or remotely.

BACKGROUND

Mobile device memory limitations constrain either a number or a size of applications (or apps) that can occupy the memory of the mobile device. Hence, such memory limitations restrict the number and size of apps that can simultaneously execute on the mobile device. Although mobile device memory has generally expanded greatly in recent years, so has the size of apps. Furthermore, larger mobile device memories require more power, which in turn increases the discharge rate of the mobile device battery. Battery depletion remains a primary key performance point of any mobile device. Furthermore, larger memories are more expensive, which is also a key factor in the development of a mobile device.

Therefore, there is a need to effectively manage mobile device memory, especially for mobile operating systems that allow for multiple, simultaneous running apps.

BRIEF DESCRIPTION OF THE DRAWINGS

Reference will now be made to the accompanying drawings, which are not necessarily drawn to scale, and wherein.

DETAILED DESCRIPTION

Figure 1:
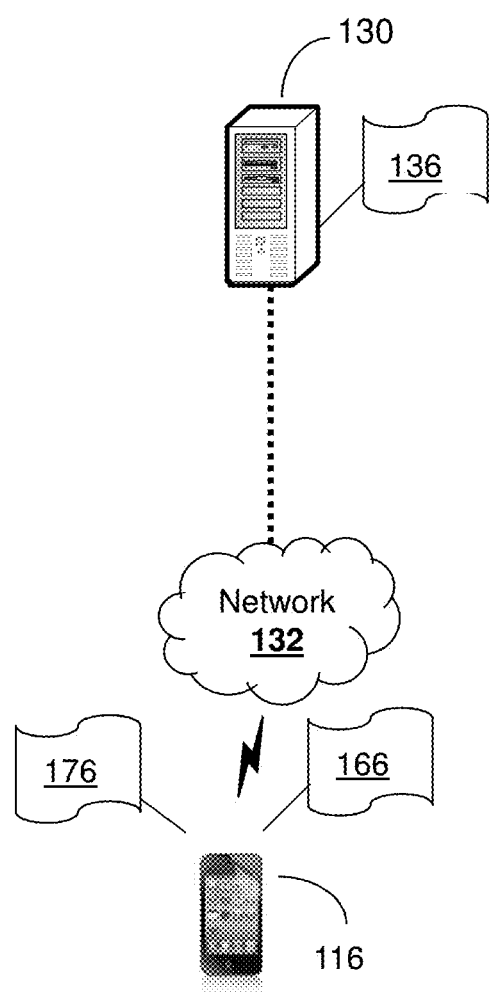
FIG. 1 depicts an illustrative embodiment of a system for optionally running mobile applications locally or virtually.

The subject disclosure describes, among other things, illustrative embodiments for managing the use of mobile device memory. Other embodiments are described in the subject disclosure.

One or more aspects of the subject disclosure include a device, comprising: a processor; and a memory that stores executable instructions that, when executed by the processor, facilitate performance of operations, comprising: retrieving metadata for a remote app corresponding to a local app, wherein processing for the remote app executes at least in part on a remote server communicatively coupled to a mobile device via a data connection, wherein the metadata includes memory requirements for a size of program code and a size of program data, anticipated utilization for a mobile processor of the mobile device and a rate of data transmission over the data connection; determining an operating condition of the mobile device, wherein the operating condition includes available memory of the mobile device, available utilization of the mobile processor, a percentage of battery charge of the mobile device; determining a state of the data connection between the mobile device and the remote server, wherein the state of the data connection includes signal strength, latency and error rate; calculating an expected rate of battery discharge based the metadata and the state of the data connection; and selecting the local app or the remote app for execution based on the state of the data connection, the operating condition and the expected rate of battery discharge.

One or more aspects of the subject disclosure include a machine-readable storage medium, comprising executable instructions that, when executed by a processor of a machine comprising memory, facilitate performance of operations, comprising: receiving a request to execute a local application; determining whether a remote application corresponding to the local application is available; responsive to a remote application being available, determining whether a data connection with a remote server is present; responsive to a data connection being present, determining whether latency of the data connection exceeds a maximum latency value for the remote application; responsive to the latency being less than the maximum latency value, determining whether memory requirements for the remote application exceeds an amount of free memory in the machine; responsive to the memory requirements being less than the amount of free memory, determining whether processing requirements for the remote application exceeds a maximum available utilization value; and responsive to the processing requirements being less than the maximum available utilization value, executing the remote application.

One or more aspects of the subject disclosure include a method, comprising: retrieving, by a processor of a mobile device, metadata for a remote application that executes on the mobile device; determining power requirements from the metadata for a data connection with a remote server that provides services to support execution of the remote application; calculating if the power requirements for the data connection exceeds a remaining charge of a battery of the mobile device; and executing the remote application responsive to the power requirements for the data connection being less than the remaining charge of the battery.

FIG. 1 depicts an illustrative embodiment of a system 100 for optionally running mobile applications locally or virtually. As shown in FIG. 1, the system 100 comprises a remote server 130, a network 132, and a device 116 communicatively coupled to the network 132. Device 116 may include a remote application (or app) 166 and/or a local app 176. Remote server 130 includes program code and/or data 136 that supports execution of the remote app 166 on device 116. Local app 176 executes on device 116 without needing computational resources from remote server 130. In an embodiment, remote server 130 provides services through network 132 to support execution of the remote app 166. In an embodiment, the services may follow a client/server paradigm, where program code 136 executes on server 130 and provides a majority of processing cycles and/or data storage, whereas remote app 166 is a thin client executing on device 116 that has smaller processing and memory requirements than local app 176. In an embodiment, a determination is made whether to run the local app 176 or alternatively to run the remote app 166 on device 116.

In an embodiment, code in firmware of device 116 makes the determination of which app to run. The firmware code may dynamically optimize memory management on device 116 by running highest priority apps locally and pushing others out for execution on remote server 130 when device 116 is communicatively coupled with remote server 130, when computational or memory resources on device 116 are constrained, and when latency requirements of a data connection with remote server 130 can be met. In an embodiment, device 116 is a mobile device having limited processor power and limited memory that is wirelessly connected to the network 132. In an alternative embodiment, device 116 is not a mobile device, but has limited processor power and memory, but may also have a high bandwidth and low latency connection to the network 132.

Figure 2:
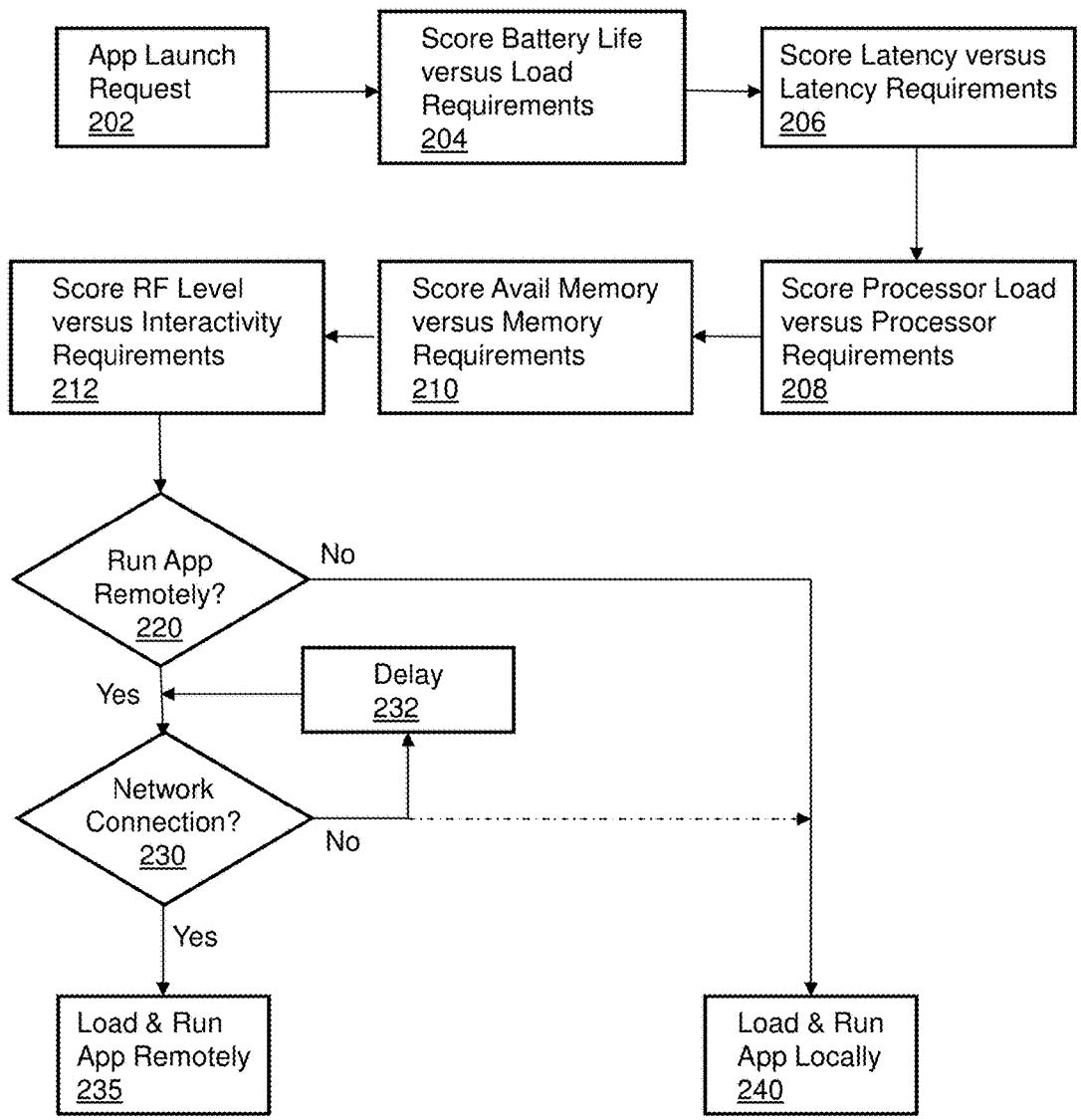
FIG. 2 depicts an illustrative embodiment of a method used in portions of the system described in FIG. 1 of an illustrative embodiment of a mobile device and server network.

FIG. 2 depicts an illustrative embodiment of a method 200 used in portions of the system 100 described in FIG. 1 of an illustrative embodiment of a mobile device utilizing network services. As shown in FIG. 2, method 200 begins at step 202, where a device receives a request for launching an app. In a mobile context, the request is generated by merely selecting an app on a user interface of the device, typically by touching an icon on a touch screen, which lodges the request with an operating system of the device. The device then begins a process to determine whether to run a local version of the app, or a remote version of the app.

In an embodiment, each application has metadata describing resource requirements, and a degree of interaction between the device and the application, which acts as a loose proxy for RF energy expenditure. For example, if an application requires very little information to run a complex routine, the app would have a small degree of interaction. This type of processing task would be a prime candidate for running the remote app on the device. The operating system could inspect available resources, and then look at what the app is going to require. A determination is made whether there is a remote app available as well as estimating how much RF energy will be expended interacting with the remote app via a wireless connection. Running apps could optionally involve thin or thick applications where thin applications have some performance or functional limitations. The option to run a thin or thick application, when to run it, and whether to run it locally versus remotely is based on a few considerations set forth in more detail below.

The process continues to step 204, where the device measures the charge of the battery and generates a score for the remaining battery life of the device and the load requirements for executing a remote app. The load requirements are estimated by the length of time that the app will need to perform the task, among other things.

The process continues to step 206, where the device generates a score for the latency of the network data connection versus the latency requirement of the remote app. In an embodiment, the actual latency of the network connection can be compared to the requirements of a remote app as part of the decision process for running a local app or a remote app. For example, if the app is a computer game that has very slow interaction with the user interface, such as may be the case for a trivia game or a crossword puzzle, then the remote app may be a good choice as the latency impact would be unnoticeable since the amount of data interchanged between the device and the remote server would be low.

In step 208, the device generates a score for a current processor load on the device versus an expected processor load for running the remote app on the device. In an embodiment, the score could be the difference between available utilization of the device's processor and the expected utilization of the device's processor to execute the remote app. The expected utilization could be defined in the metadata for the remote app, and might also depend upon the computational horsepower of the device's processor. In another embodiment, the score could merely be based on the available utilization of the device's processor, to determine whether the processor has becoming constrained.

In step 210, the device generates a score for available free memory on the device versus expected memory requirements for running the remote app on the device. In an embodiment, the score could be based on the available free memory left in the device, to determine whether the device is running low on free memory. Both data memory and program code memory could be factored into the score. In another embodiment, the score could be the difference between available memory in the device and the expected amount of memory needed to execute the remote app. The expected memory could be defined in the metadata for the remote app.

In step 212, the device generates a score for the signal strength of the data connection versus interactivity requirements for the remote app. For example, if the device is connected to a very nearby Wi-Fi connection having a very strong signal strength, then heavy data interaction could easily be supported. This score can reflect the relative effect of signal strength versus the data interactivity needs of the remote app.

In step 220, a determination is made whether to execute the remote app or the local app. In aggregation, the scores amount to a scoring algorithm that enables the device to make a decision whether to run the local app or the remote app, and optionally whether to run a thin or thick version of the remote app. Each application has metadata describing the resource requirements, and the degree of interaction between the device and the application as a loose proxy for RF energy expenditure. A decision has to be made as to whether to use RF power (battery drain) to launch the remote app and then send a functional request to that app. If the device has plenty of resources available, it makes sense to launch the local app and not expend RF energy. Alternatively, if local resources are highly constrained, the application could be launched in the cloud and the device would then have to interact with that application, thereby expending RF energy. For example, if an application requires very little information to run a complex routine, this would be a prime candidate for running a remote app, so that the processing cycles needed to implement the complex routine can be performed on the remote server. Additionally, the type of wireless connection comes into play. A strong Wi-Fi connection implies the device can communicate wirelessly with very low power. In contrast, a mobile network connection at very low signal strength implies that a mobile device must transmit a lot of power to communicate with the remote server that supplies services to enable execution of the remote app.

If the scoring algorithm determines that the remote app should be run, then the process proceeds to step 230 where the device checks to see whether there is a network connection to the remote server. If the device has no connection to the remote server, then the process proceeds to step 232. If there is a network connection, then the process proceeds to step 235.

In step 232, there is no option to run a remote app, though the option to delay the running of it is reasonable. If the remote app merely updates software on the device, chances are it can be delayed for days, as set forth in the metadata identifying the criticality for running at a specific time and by how much the run can be delayed. Once the delay is over, the process continues at step 230. Alternatively, if no network connection is found, rather than delay again, the process may proceed to step 240.

In step 235, the remote app is loaded into the memory of the device and executed by the device, thereby establishing communications with the remote server to obtain the necessary services to run the remote app.

Alternatively, in step 240, the local app is loaded into the memory of the device and executed by the device.

Figure 3:
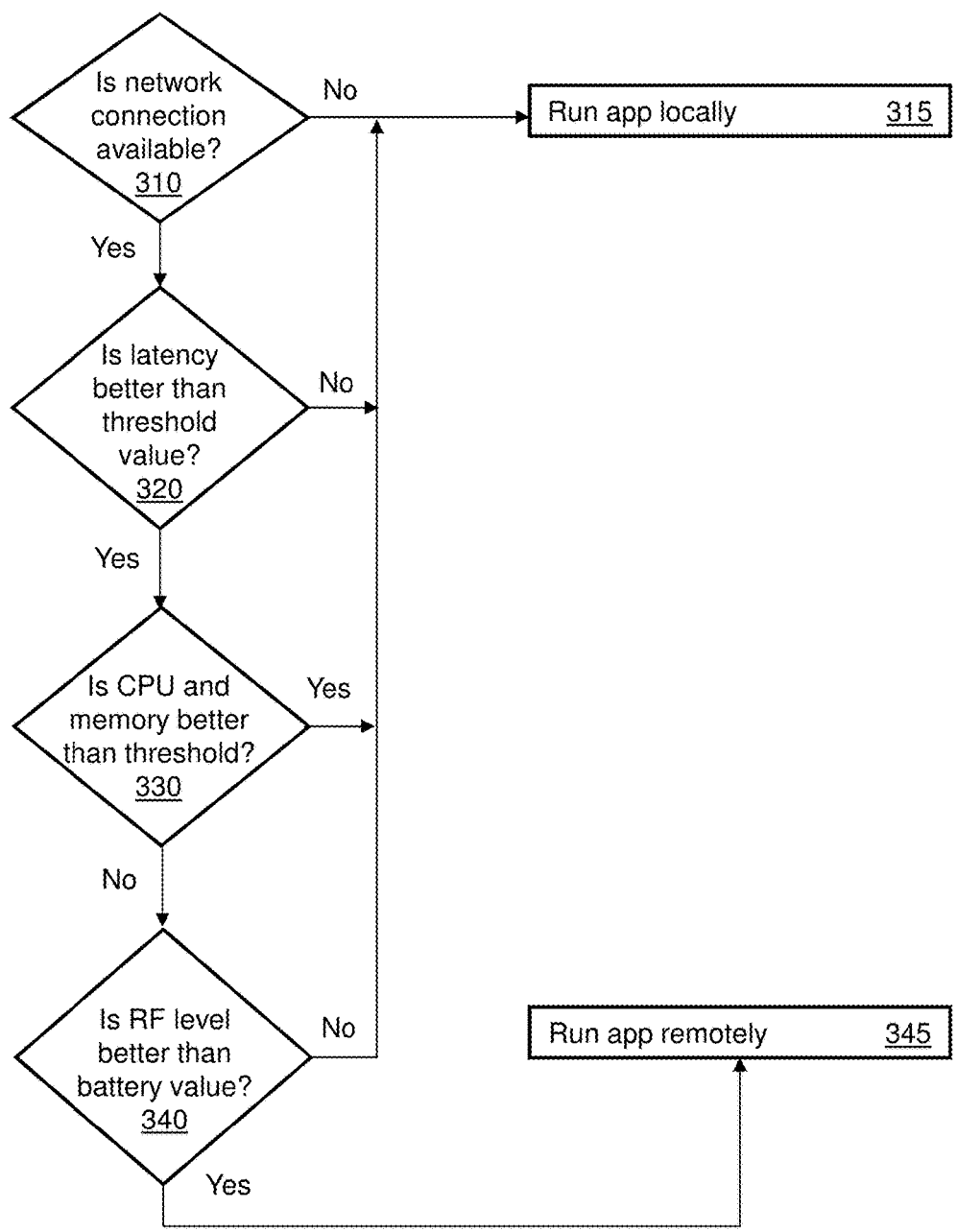
FIG. 3 depicts an illustrative embodiment of a method used in portions of the method described in FIG. 2.

FIG. 3 depicts an illustrative embodiment of a method used in portions of the method described in FIG. 2. In particular, FIG. 3 illustrates a decision making process to determine whether to execute a remote app or a local app. As shown in FIG. 3, the process begins with step 310 where the device checks to see if a network connection is available. In an embodiment, the device might be a mobile device and the check might entail whether a wireless connection is available. If a network connection is available, then the process continues at step 320. If no network connection is available, then the process ends at step 315, where the decision is reached to run the local app.

In step 320, the device checks to see whether the latency of the network connection is better than a threshold value. The threshold value can be provided by the metadata associated with the remote app. The latency can be checked by sending a ping packet to the remote server, receiving an acknowledgement packet, and measuring the round trip time between sending the ping and receiving the acknowledgement. If the latency is better than the threshold value, then the process continues at step 330. If the latency is worse than the threshold value, then the process ends at step 315, where the decision is reached to run the local app.

In step 330, the device checks to see whether processing power and memory are sufficient. The device can compare available CPU cycles (i.e., remaining utilization) to a threshold value provided by the metadata associated with the remote app. For the memory, the device can compare free memory to another threshold value provided by the metadata associated with the remote app. In one embodiment, if there is sufficient processing power and memory, then then the process ends at step 315, where the decision is reached to run the local app. Otherwise, the process continues at step 340. In another embodiment, if there is sufficient processing power and free memory to load and execute the remote app, then the process continues at step 340.

In step 340, the device checks the signal strength of a wireless network connection between the device and the network. If the signal strength is weak, then the power required to send data to the remote server will be greater. A comparison is made between the expected power requirement, based on the signal strength, and the amount of battery charge remaining for the device. In an embodiment, the metadata for the remote app can supply a factor to convert signal strength to an expected power requirement. If the expected power requirement is within the remaining battery capacity, then the process ends at step 345, where the decision is reached to run the remote app. On the other hand, if the expected power requirement exceeds the remaining battery capacity, then the process ends at step 315, where the decision is reached to run the local app.

While for purposes of simplicity of explanation, the respective processes are shown and described as a series of blocks in FIGS. 2-3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
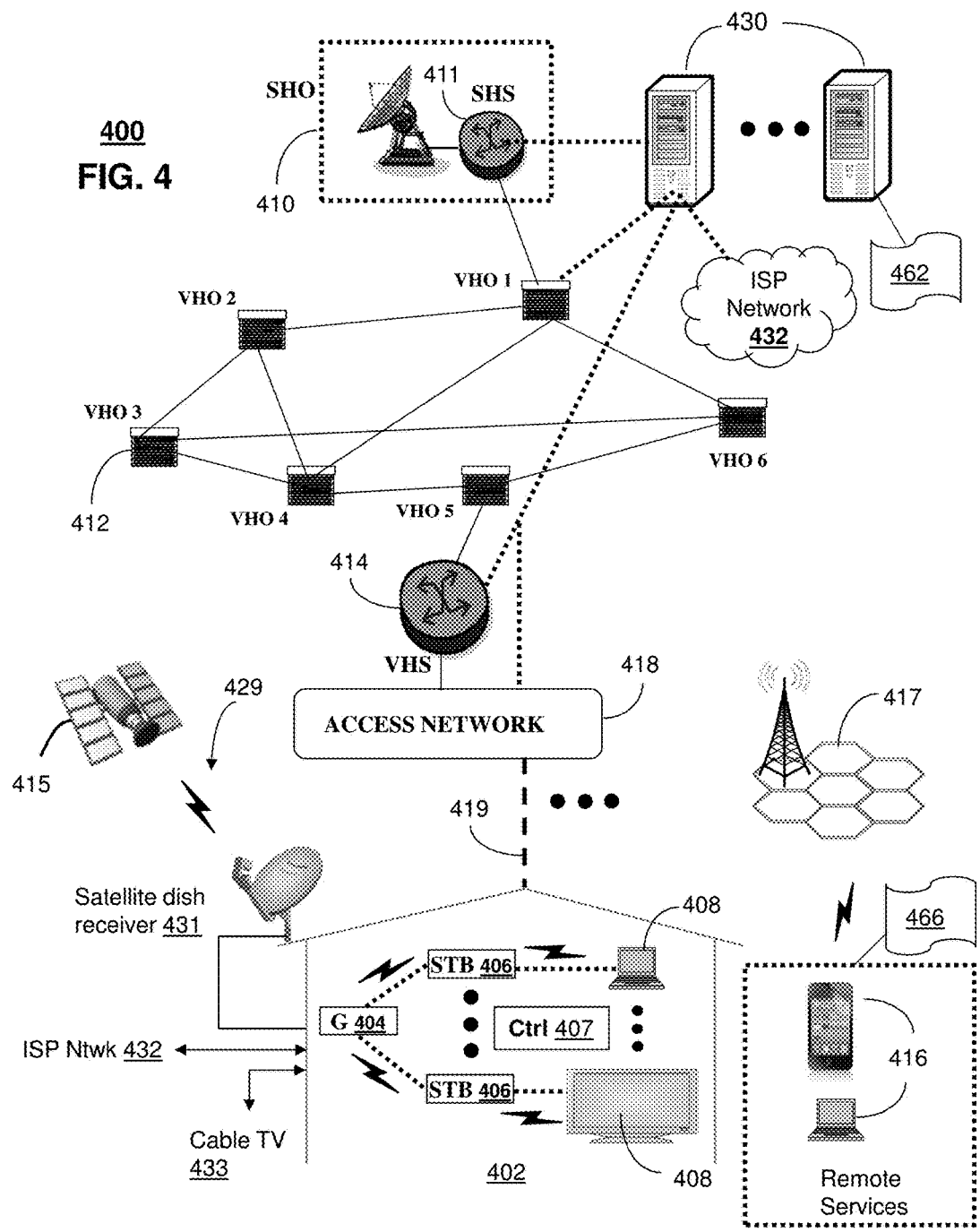
FIGS. 4-5 depict illustrative embodiments of communication systems that provide media services to a mobile device client.

FIG. 4 depicts an illustrative embodiment of a first communication system 400 for delivering media content. The communication system 400 can represent an Internet Protocol Television (IPTV) media system. Communication system 400 can be overlaid or operably coupled with the remote server of FIG. 1 as another representative embodiment of communication system 400. For instance, one or more devices illustrated in the communication system 400 of FIG. 4 comprising a processor and a memory that stores executable instructions that, when executed by the processor, can facilitate performance of operations, comprising: retrieving metadata for a remote app corresponding to a local app, wherein processing for the remote app executes at least in part on a remote server communicatively coupled to a mobile device via a data connection, wherein the metadata includes memory requirements for a size of program code and a size of program data, anticipated utilization for a mobile processor of the mobile device and a rate of data transmission over the data connection; determining an operating condition of the mobile device, wherein the operating condition includes available memory of the mobile device, available utilization of the mobile processor, a percentage of battery charge of the mobile device; determining a state of the data connection between the mobile device and the remote server, wherein the state of the data connection includes signal strength, latency and error rate; calculating an expected rate of battery discharge based the metadata and the state of the data connection; and selecting the local app or the remote app for execution based on the state of the data connection, the operating condition and the expected rate of battery discharge.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. The computing device 430 can provide copies of applications, such as the remote app 166 or local app 176 of FIG. 1. The computing devices 430 can supply other resources needed to support execution of the remote app 166 of FIG. 1, such as processing cycles and/or data storage.

Communication system 400 can also provide for all or a portion of the computing devices 430 to function as a remote server (herein referred to as server 430). The server 430 can use computing and communication technology to perform function 462, which can include among other things, the techniques described by method 200 of FIG. 2 or method 300 of FIG. 3. For instance, function 462 of server 430 can be similar to the functions described for remote server 130 of FIG. 1 in accordance with methods 200 and 300. In addition, the computing devices 430 can supply metadata for the remote app 166 or local app 176 of FIG. 1. Finally, the wireless communication devices 416 can be provisioned with software functions 466, to utilize the services of server 430. For instance, functions 466 of wireless communication devices 416 can be similar to the functions described for the device 416 of FIG. 1 in accordance with methods 200 and 300.

Figure 5:
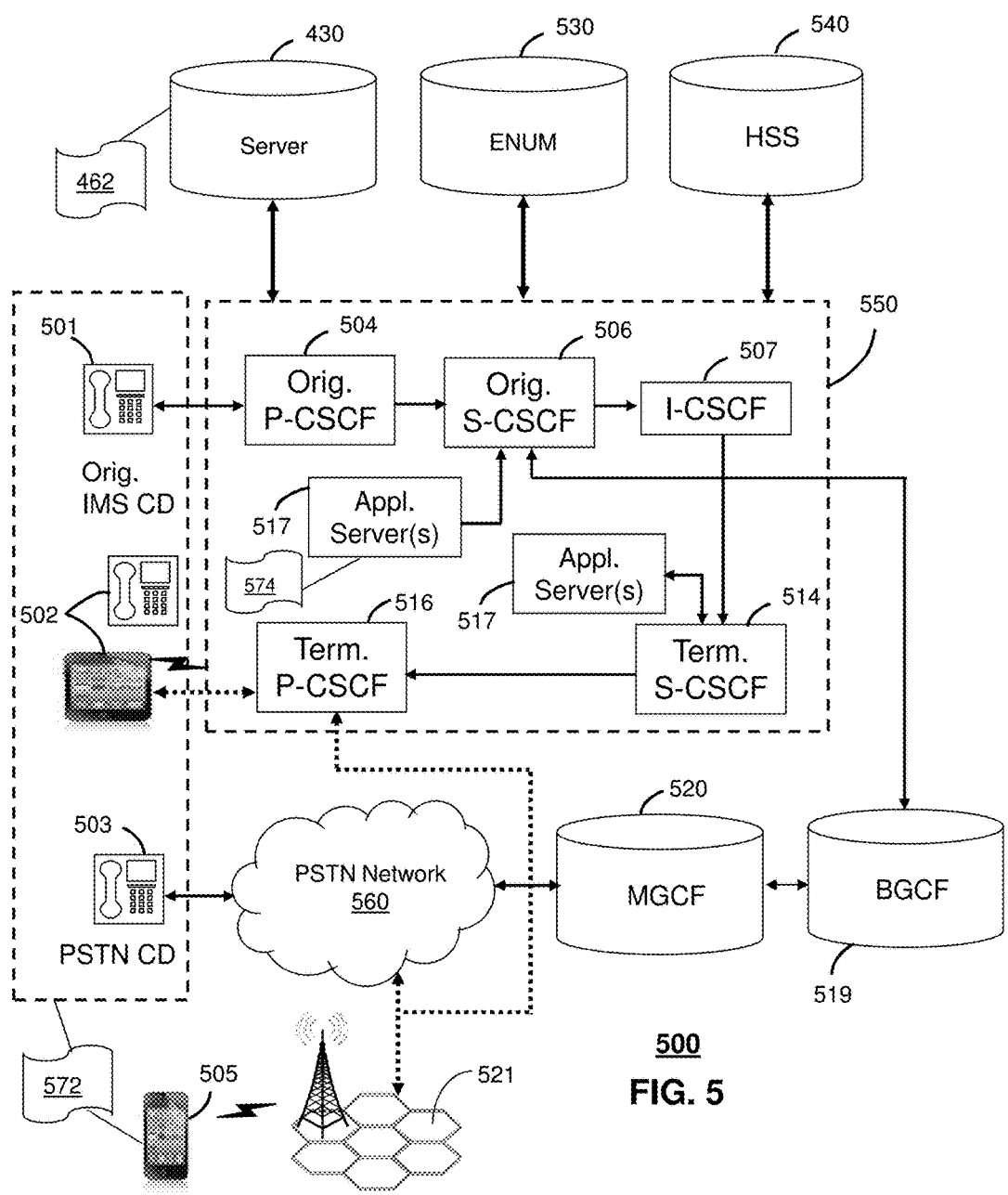

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. For example, devices in system 500 may assist with performance of a method, comprising: retrieving, by a processor of a mobile device, metadata for a remote application that executes on the mobile device; determining power requirements from the metadata for a data connection with a remote server that provides services to support execution of the remote application; calculating if the power requirements for the data connection exceeds a remaining charge of a battery of the mobile device; and executing the remote application responsive to the power requirements for the data connection being less than the remaining charge of the battery.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 462 and thereby provide services to the remote app of FIG. 1 in accordance with methods 200 and 300 of FIGS. 2-3. CDs 501, 502, 503 and 505, which can be adapted with software to perform function 572 to utilize the services of the widget 430 similar to the functions described for device 116 of FIG. 1 in accordance with methods 200 and 300 of FIGS. 2-3. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
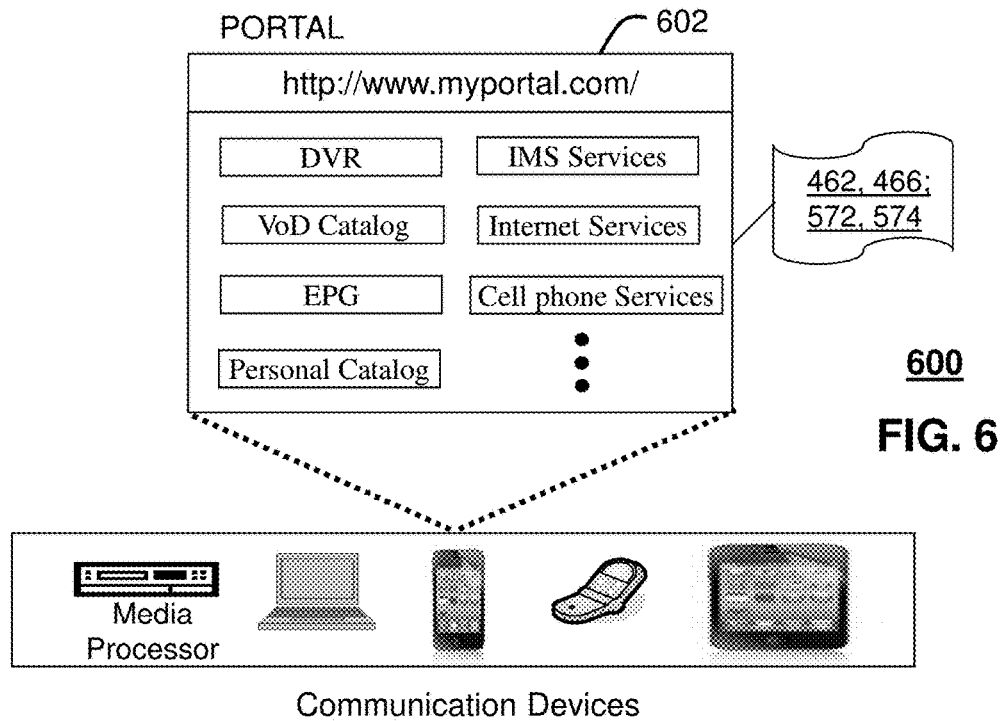
FIG. 6 depicts an illustrative embodiment of a web portal for interacting with the communication systems for a mobile device.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462, 466, and 572-574 to adapt these applications as may be desired by subscribers and/or service providers of system 100 of FIG. 1, and communication systems 400-500. For instance, users of the services provided by server 130 or server 430 can log into their on-line accounts and provision the servers 130 or server 430 with remote apps or local apps for downloading by device 116, and associated metadata, and so on. Service providers can log onto an administrator account to provision, monitor and/or maintain the system 100 of FIG. 1 or server 430.

Figure 7:
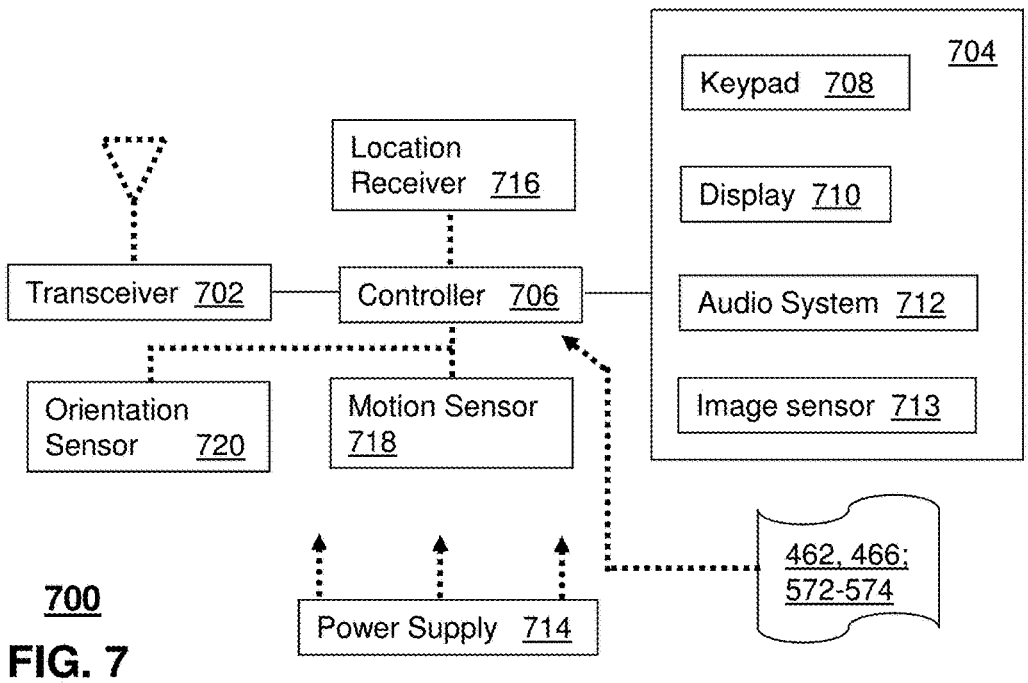
FIG. 7 depicts an illustrative embodiment of a mobile communication device.

FIG. 7 depicts an illustrative embodiment of a communication device 700. Communication device 700 can serve in whole or in part as an illustrative embodiment of the devices depicted in FIG. 1, and FIGS. 4-5 and can be configured to perform portions of methods 200 of FIG. 2 and 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the remote server and/or the device of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the system of FIG. 1, communication systems 400-500 of FIGS. 4-5 such as a gaming console and a media player. In addition, the controller 706 can be adapted in various embodiments to perform the functions 462, 466 and 572-574, respectively.

Upon reviewing the aforementioned embodiments, it would be evident to an artisan with ordinary skill in the art that said embodiments can be modified, reduced, or enhanced without departing from the scope of the claims described below. For example, the determination of whether to execute a remote app or a local app can be performed wholly by the device running the local or remote app, by a remote server, or by both.

In another embodiment, the determination whether to run a remote app or a local app may be made by the device processor executing code stored in the firmware of a mobile device. Metadata describing the remote app can also influence whether a thin client version or a thick client version of the remote app is chosen for execution. The metadata includes aspects of each version of the application, including the amount of memory needed to store data and memory to store application code for each version, the anticipated mobile device processor utilization for each version, a measure of interactivity with the application (e.g., frequency of user inputs), and the rate of data transmission/reception between the thin client and the remote server. Current operating conditions of the mobile device include percentage of free memory available, processor utilization, and state of battery charge. Factors that could affect the operation of a thin client include the state of wireless connections, such as cellular mobile network connections, Wi-Fi connections, or Bluetooth connections, including signal strength, latency, and error rate(s) of wireless connections, and anticipated energy requirements during operation of the thin client based on the state of wireless connections. Regarding signal strength, for example, a strong wireless connection could imply that the mobile device can communicate wirelessly with very low power consumption. In contrast, a mobile network connection at very low signal strength implies the mobile device must transmit a lot of RF power to communicate with the remote server running a cloud based application that supports the thin client version. The decision whether to employ a thin client would be based on the power consumption given the state of the wireless connection, and the current charge state of the mobile device battery. The frequency of user interaction associated with the application, and ultimately the amount of data exchanged between mobile device and the remote server, would influence the tolerance for latency in the wireless connection. Similarly, the error rate would influence the decision based on the application's tolerance for error in the communication path.

In another embodiment, the determination whether to run a remote app or a local app may be made after a local app or remote app is executing. If such determination results in choosing a remote app, the local app may switch to a remote app dynamically, or vice-versa. Ideally for certain applications that may lend themselves to parallel processing algorithms, the firmware may adjust the operation of the thin client dynamically, by changing the amount of data stored and processing that is performed remotely, and the amount of data stored and processing that is perform locally. The adjustment may be based on changes in the status of the wireless connection. The adjustment may also be based on the operating condition of the mobile device, such as remaining free memory, processor utilization percentage, or remaining battery charge. The adjustment may also be based on the operating condition of the remote server. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

In an embodiment, the device launching the app may be a stationary, but battery operated device, and may have a wired network connection instead of a wireless network connection. For such wired connection, latency may still be a factor influencing which app to run, but signal strength should not be a factor. In an embodiment, a variety of network connections may be evaluated to determine whether to run the remote app or the local app.

Figure 8:
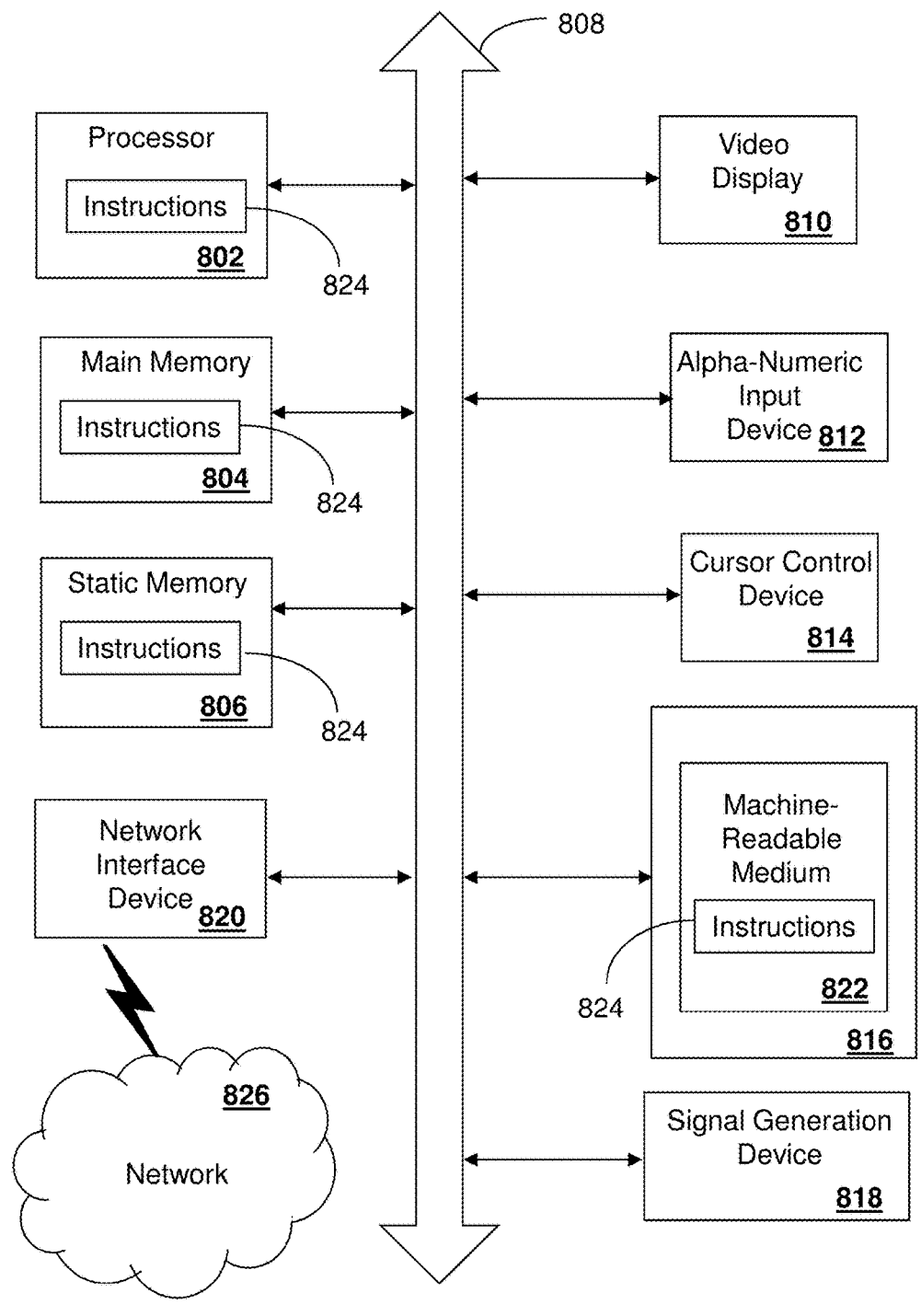
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 430, the media processor 406, or the remote server 130 and other devices of FIGS. 1 and 4-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
retrieving metadata for a remote application corresponding to a local application, wherein processing for the remote application executes at least in part on a remote server communicatively coupled to a mobile device via a data connection, wherein the metadata includes memory requirements for a size of program code and a size of program data, anticipated utilization for a mobile processor of the mobile device and a rate of data transmission over the data connection;
determining an operating condition of the mobile device, wherein the operating condition includes available memory of the mobile device, available utilization of the mobile processor, and a percentage of battery charge of the mobile device;
determining a state of the data connection between the mobile device and the remote server, wherein the state of the data connection includes signal strength, latency and error rate;
calculating an expected rate of battery discharge based on the metadata and the state of the data connection; and
selecting one of the local application or, alternatively, the remote application corresponding to the local application for execution based on the state of the data connection, the operating condition and the expected rate of battery discharge.

2. The device of claim 1, wherein the selecting further comprises determining whether the data connection is available.

3. The device of claim 2, wherein the selecting further comprises determining whether the latency is greater than a first threshold value.

4. The device of claim 3, wherein the selecting further comprises determining whether the available utilization of the mobile processor is greater than the anticipated utilization of the mobile processor.

5. The device of claim 4, wherein the selecting further comprises determining whether the available memory is greater than the size of the program code plus the size of the program data.

6. The device of claim 5, wherein the expected rate of battery discharge is proportional to the rate of data transmission and inversely proportional to signal strength.

7. The device of claim 6, wherein the selecting further comprises determining whether the percentage of battery charge divided by the expected rate of battery discharge is greater than a second threshold value.

8. The device of claim 1, wherein the processing system comprises the mobile processor, and wherein the local application executes on the mobile device without requiring computational resources of the remote server.

9. The device of claim 1, wherein the processing system comprises a plurality of processors operating in a distributed processing environment.

10. A non-transitory, machine-readable storage medium, comprising executable instructions that, when executed by a processing system including a processor of a machine comprising memory, facilitate performance of operations, the operations comprising:
receiving a request to execute a local application to obtain a requested local application;
determining, responsive to the request to execute the local application, whether a remote application corresponding to the local application is available;
responsive to a remote application being available, determining whether a data connection with a remote server is present;
responsive to a data connection being present, determining whether latency of the data connection exceeds a maximum latency value for the remote application;
responsive to the latency being less than the maximum latency value, determining whether memory requirements for the remote application exceeds an amount of free memory in the machine;

responsive to the memory requirements being less than the amount of free memory, determining whether processing requirements for the remote application exceeds a maximum available utilization value; and responsive to the processing requirements being less than the maximum available utilization value, executing the remote application in lieu of the requested local application.

11. The non-transitory, machine-readable storage medium of claim 10, wherein the operations further comprise determining whether power requirements for the data connection exceeds a remaining charge of a battery; and wherein executing the remote application is responsive to the power requirements for the data connection being less than the remaining charge of the battery.

12. The non-transitory, machine-readable storage medium of claim 11, wherein the operations further comprise executing the requested local application responsive to not executing the remote application.

13. The non-transitory, machine-readable storage medium of claim 10, wherein the maximum latency value depends is set by the remote application.

14. The non-transitory, machine-readable storage medium of claim 10, wherein the maximum available utilization value is an available utilization of the processing system.

15. The non-transitory, machine-readable storage medium of claim 10, wherein the operations further comprise, responsive to the data connection being absent, delaying execution and rechecking for the data connection.

16. The non-transitory, machine-readable storage medium of claim 15, wherein the delay is set by the remote application.

17. A method, comprising:
retrieving, by a processing system that includes a processor of a mobile device, metadata for a remote application that corresponds to a local application that executes on the mobile device;

determining, by the processing system, power requirements from the metadata for a data connection with a remote server that provides services to support execution of the remote application;

calculating, by the processing system, if the power requirements for the data connection exceeds a remaining charge of a battery of the mobile device; and executing, by the processing system, the remote application, in lieu of the local application that executes on the mobile device, responsive to the power requirements for the data connection being less than the remaining charge of the battery.

18. The method of claim 17, wherein the power requirements depends upon a type of data connection.

19. The method of claim 18, wherein the type of data connection comprises a Wi-Fi connection, a Bluetooth connection, a WAN connection, a mobile communication network data connection.

20. The method of claim 17, wherein executing the remote application is further responsive to a priority of the remote application compared to a priority of other applications executing on the mobile device.

* * * * *